United States Patent [19]

Eberhart et al.

[11] 4,319,313

[45] Mar. 9, 1982

[54] LAMP SOCKET MOUNTING AND ADJUSTING ASSEMBLY

[75] Inventors: Clem W. Eberhart, Vicksburg, Miss.; Alexander Zwillich, Pittsburgh, Pa.

[73] Assignee: Westinghouse Electric Corp., Pittsburgh, Pa.

[21] Appl. No.: 143,209

[22] Filed: Apr. 24, 1980

[51] Int. Cl.[3] .............................................. B60Q 1/00

[52] U.S. Cl. .................................... 362/370; 362/374; 362/375

[58] Field of Search ............... 362/362, 368, 370, 371, 362/374, 375, 376, 269, 437, 439

[56] References Cited

U.S. PATENT DOCUMENTS 3,299,263 1/1967 Bjontejard .......................... 362/375
3,348,035 10/1967 Franklin .............................. 362/375
3,705,301 12/1972 Franklin .............................. 362/375
4,010,362 3/1977 Fletcher .............................. 362/375

*Primary Examiner*—Donald P. Walsh
*Attorney, Agent, or Firm*—B. R. Studebaker

[57] ABSTRACT

A lamp socket mounting and adjusting assembly for an outdoor lighting luminaire in which the lamp socket is secured to an adjustable socket mounting plate which is variably positionable with respect to a socket mounting bracket to vary both the focal point and the focal tilt axis of the lamp. Separate sets of indicia on the socket mounting bracket indicate both the focal axis tilt and the focal point selected for the lamp.

8 Claims, 4 Drawing Figures

LAMP SOCKET MOUNTING AND ADJUSTING ASSEMBLY

BACKGROUND OF THE INVENTION

This invention relates to outdoor street lighting or area lighting luminaires and more particularly to a novel lamp socket mounting and adjusting assembly for selectively adjusting the focal point and focal axis tilt of a lamp employed in such a luminaire.

In an outdoor street lighting or area lighting luminaire, it is desirable to be able to change the light distribution pattern of the luminaire without resorting to changing the reflector design or the light distribution pattern by utilizing a plurality of different refractors. One way to accomplish the modification of the light distribution pattern produced by a luminaire is to change the focal point or focal axis of the light source with respect to the remainder of the optical cavity.

In the past, the position of the light source with respect to the reflector and refractor has been adjusted by various types of socket mounting assemblies. Some examples of variety adjustable socket mounting assemblies for use in street lighting luminaires are disclosed in U.S. Pat. No. 3,299,263 to Bjontegard, U.S. Pat. No. 3,348,035 to Franklin et al. and U.S. Pat. No. 3,705,301 also to Franklin et al.

Some of the drawbacks of these earlier lamp socket adjustment mechanisms are the fact that in some instances, they must be disassembled and parts reversed in order to provide for the full scope of adjustability necessary to provide the various kinds of different light distribution patterns. Others, of the prior art lamp socket adjustment assemblies are constructed such that the adjusting screws and movable parts are difficult to gain access to because of their locations on the side of the adjustment mechanisms. If the lamp socket assembly is lowered to a point below the sidewall of the housing to provide access to the adjusting screws, then the luminaire must have a substantially greater vertical dimension giving a bulky less streamlined appearance. Additionally, it is important that the indicia indicating the position of the lamp socket with respect to the optical cavity are easily readable by the person making the final adjustment of the lamp socket mounting assembly.

SUMMARY OF THE INVENTION

The foregoing objections to the prior art lamp socket mounting and adjusting assemblies have been obviated in accordance with the present invention by providing in a street lighting type luminaire a lamp socket mounting and adjusting assembly which provides for a plurality of different focal point positions as well as several different focal axis tilt adjustments in a single simplified mounting assembly which can be accomplished by merely loosening two screws and in which the final adjustment will be readily readable from indicia viewable from beneath the luminaire housing.

The foregoing is accomplished by providing an outdoor lighting luminaire including an open bottomed inverted dish-shaped housing including slip fitter means at one end thereof for mounting said luminaire to a luminar support pipe, a reflector having a lamp socket receiving opening in one end thereof secured to the inside of the housing in the end thereof remote from the slip fitter means and a refractor carrying door member pivotally secured to the luminaire housing and constructed and arranged to close off the open bottom of said housing with the reflector and refractor combining to form an optical cavity when the door member is in a closed position. Within this combination the improved lamp socket mounting and adjusting assembly of this invention secured to the inside of the housing adjacent the lamp socket receiving opening in the reflector with the lamp socket mounting and adjusting assembly including a bracket fixedly mounted to the housing and a socket mounting plate adjustably mounted to the bracket. A lamp socket is secured to the socket mounting plate and projects through the socket receiving opening in the reflector into the optical cavity with the socket mounting plate being variably positionable on the bracket to vary both the focal point and the focal axis tilt of the socket with respect to the reflector. The bracket includes a main body portion, a top flange extending normal to the main body portion and secured to the luminaire housing, a pair of side flanges extending normal to the main body portion and a pair of bottom flanges extending at an obtuse angle from the main body portion. The main body portion includes a socket receiving aperture therethrough, each of the side flanges have an elongated open-ended cut-out portion therein and a plurality of teeth in each of the cut-out portions. Each of the bottom flanges include an elongated slot therein. The socket mounting plate has the lamp socket secured thereto with the socket mounting plate having a pair of notched arm portions extending laterally therefrom and a pair of L-shaped leg portions extending downwardly therefrom with a threaded aperture through the bottom portion of each of the L-shaped leg portions. The notched arm portions of the socket mounting plate are engaged between predetermined ones of the plurality of teeth in each of the cut-out portions and a securing means extends through the elongated slots in the bottom flanges and is threadably received in the threaded apertures in the L-shaped leg portions of the socket mounting plate to thereby permit the lamp socket to be predeterminably positioned with respect to the optical cavity. Indicia of the focal axis tilt are provided on the pair of bottom flanges and indicia of the focal point location are provided on the pair of side flanges adjacent to the cut-out portions to provide indicia of the particular lamp focal point and focal axis tilt selected for the lamp socket.

BRIEF DESCRIPTION OF THE DRAWINGS

Many of the attendant advantages of the present invention will become more readily apparent and better understood as the following detailed description is considered in connection with the accompanying drawings, in which.

DESCRIPTION OF THE PREFERRED EMBODIMENT

Figure 1:
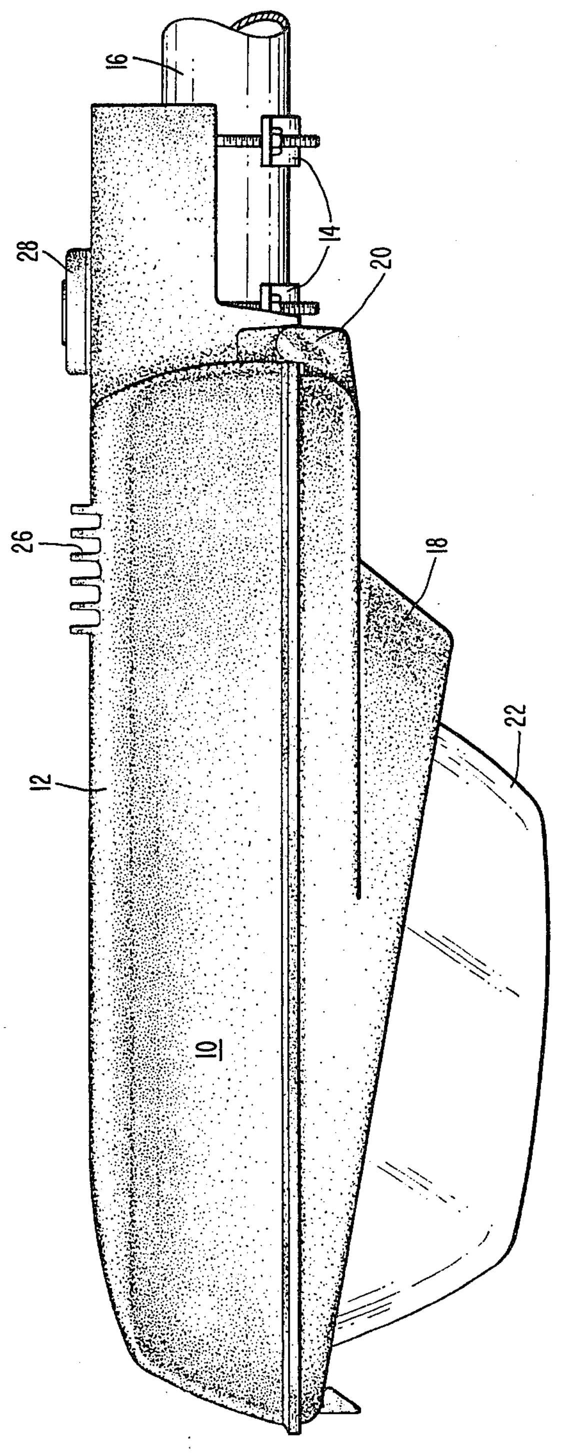
FIG. 1 is a side-elevational view of a street lighting luminaire adapted to accommodate the lamp socket mounting and adjusting assembly of this invention.

Referring now in detail to the drawings wherein like reference characters represent like parts throughout the several views, there is illustrated in FIG. 1 a roadway or area lighting luminaire generally designated 10 which is adapted to employ the lamp socket mounting and adjusting assembly of this invention. The luminaire 10 includes an open-bottomed inverted dish-shaped housing 12 having a conventional slip-fitter mechanism 14 at one end thereof for mounting the luminaire to a luminaire support pipe 16. A housing closure member in the form of a refractor carrying door member 18 is hinged to the luminaire housing at 20 and carries therein a typical refractor 22 which in conjunction with the luminaire reflector 24 forms the optical cavity in which the illuminating source is mounted. The luminaire housing may also include on its top surface heat dissipating fins 26 which are located in the area of the housing within which the luminaire ballast is mounted. Also, the luminaire may be provided with a photocontrol socket 28 on the upper outer surface of the luminaire housing 12.

Figure 2:
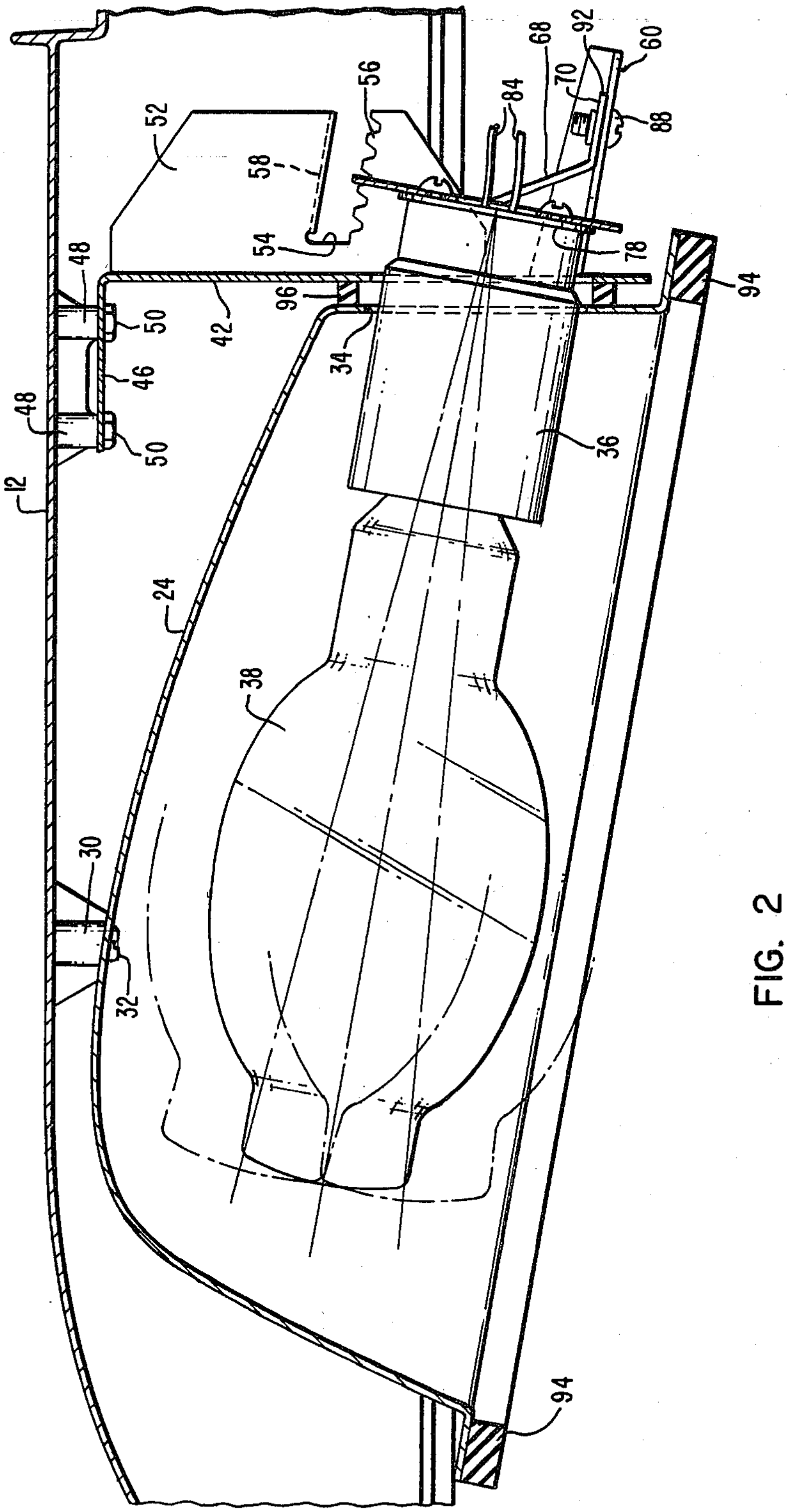
FIG. 2 is a side-elevational view partly in section of a portion of the optical cavity and the lamp socket mounting and adjusting assembly of this invention.
Figure 3:
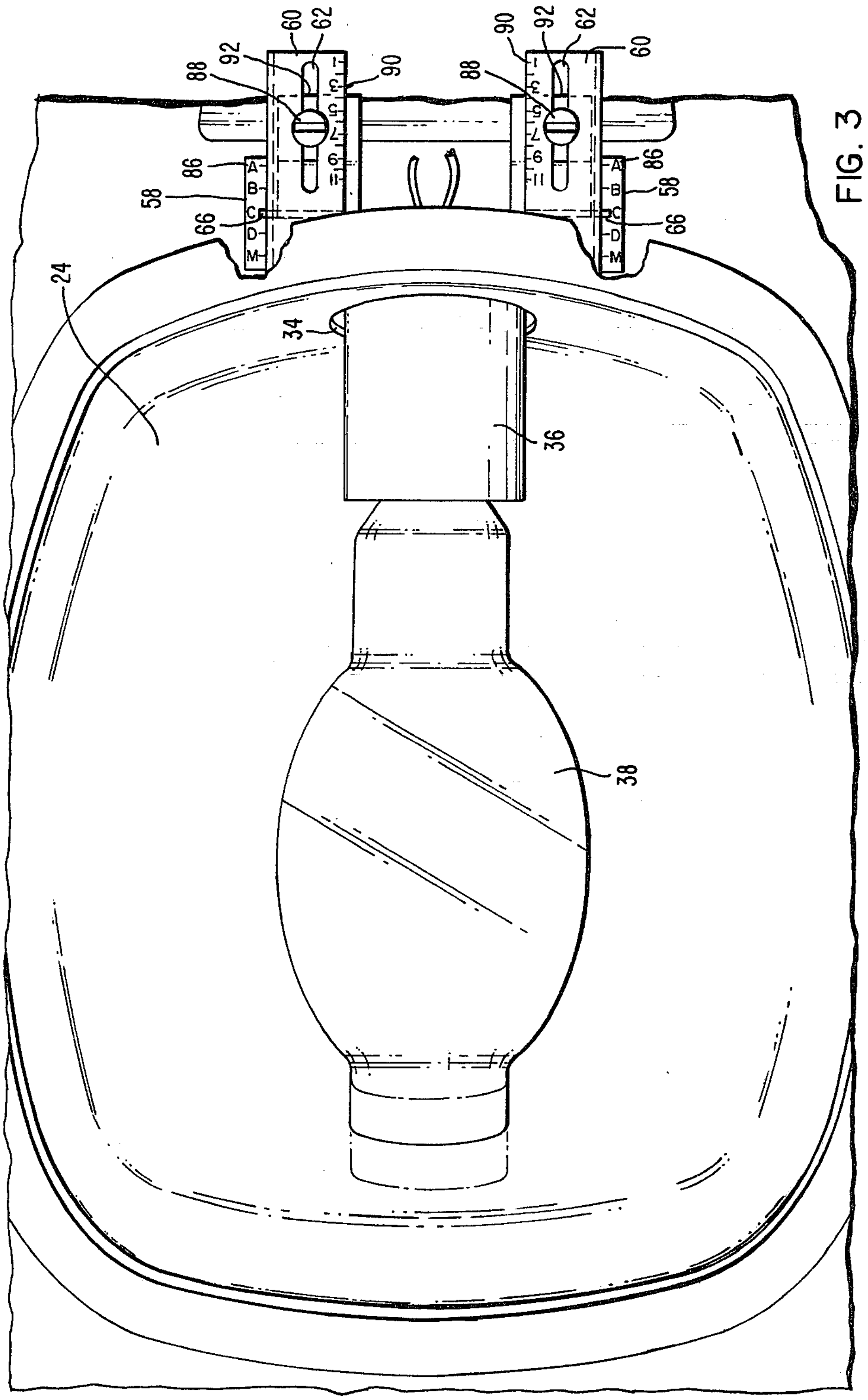
FIG. 3 is a bottom plan view similar to FIG. 2.

Referring now to FIGS. 2 and 3, the reflector 24 may be secured to a boss 30 on the interior surface of the of the luminaire housing 12 by means of a screw 32. The reflector 24 is also provided with an aperture 34 therethrough for receiving the lamp socket 36 within which a HID type lamp 38 may be mounted.

Figure 4:
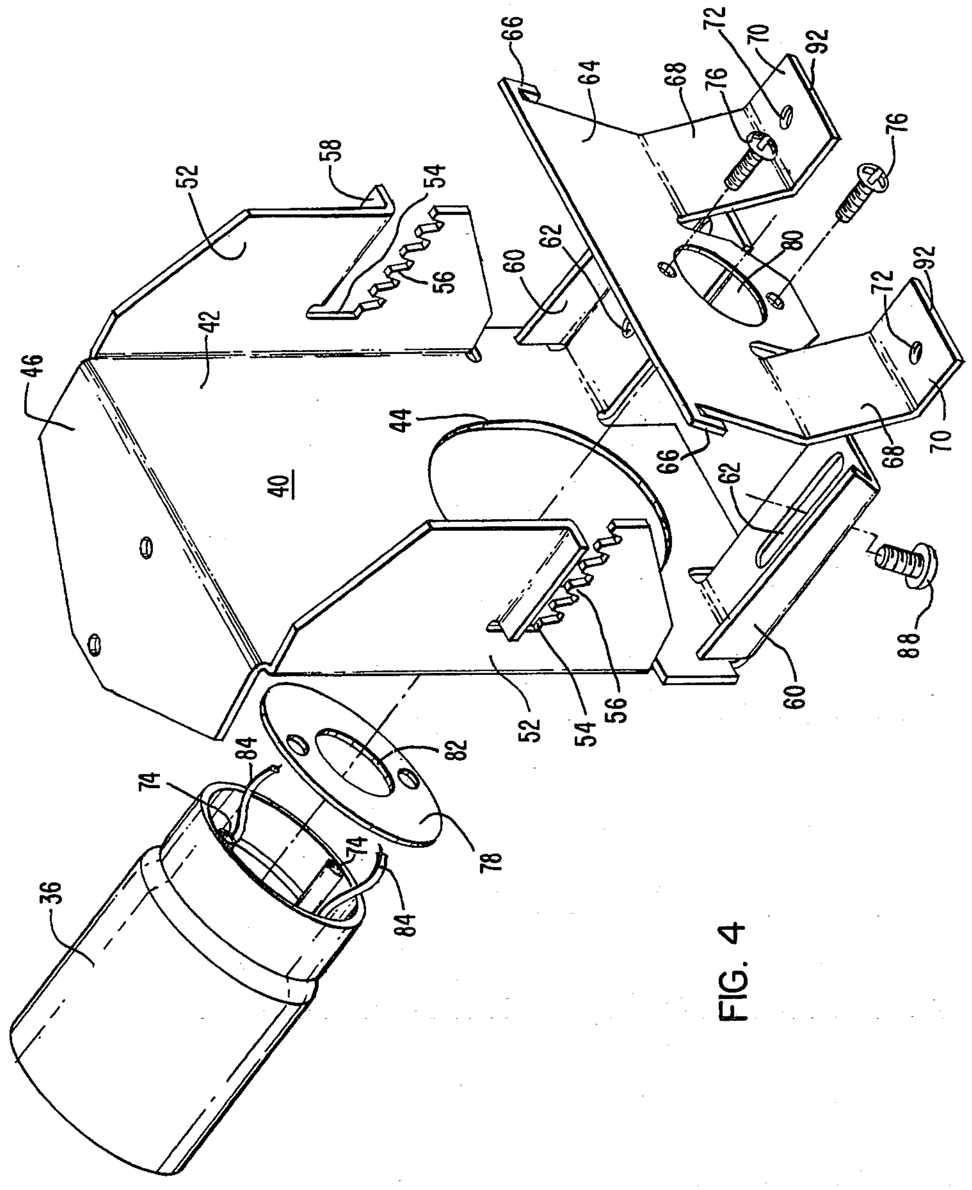
FIG. 4 is an exploded view of the socket mounting and adjusting assembly of this invention.

The lamp socket mounting and adjusting assembly best illustrated in FIG. 4 includes a bracket generally designated 40 including a main body portion 42 having a lamp socket receiving aperture 44 therethrough. The main body portion 42 has at its upper edge extending normal thereto a top flange 46 which is constructed and arranged to be secured to a pair of bosses 48 on the inside surface of the luminaire housing 12 by means of a pair of threaded bolts 50 for supporting the lamp socket mounting and adjusting assembly within the luminaire housing. The bracket 40 further includes a pair of side flanges 52 extending at right angles to the main body portion 42 in a direction opposite from the top flange 46. The side flanges 52 include elongated open-ended cut-out portions 54 which have a plurality of teeth 56 along its bottom edge and a lateral flange 58 along its top edge. At the bottom of the main body portion 42, a pair of bottom flanges 60 extend in the same direction as the side flanges 52 but extend at a slight obtuse angle from the main body portion 42. Each of the bottom flanges 60 include an elongated slot 62 therein.

A socket mounting plate 64 includes a pair of laterally extending notched arm portions 66 and a pair of L-shaped leg portions 68 which include a bottom or foot portion 70 having threaded apertures 72 therethrough.

The lamp socket 36 includes threaded bosses 74 therein and a pair of bolts 76 extend through holes in the socket mounting plate 64, through an insulating disc 78 and are threaded into the threaded bosses 74 to mount the socket 36 to the socket mounting plate 64. The socket mounting plate 64 is provided with a central aperture 80 therethrough and the insulating disk 78 is also provided with a central aperture 82 through which electrical wires 84 extend to provide power to the lamp 38 mounted in the socket 36.

The socket mounting and adjusting assembly of this invention provides for various lamp positions within the optical cavity defined by the reflector 24 and the refractor 22. The notched arm portions 66 of the socket mounting plate can be positioned in any of the several depressions between the teeth 56 on the side flanges of the socket mounting plate, which as illustrated, provides for five different lamp focal point positions along the center line of the lamp. These positions are identified by indicia inscribed on the bottom side of the flanges 58, indicia 86 on the underside of the flanges 58, which can be viewed from the underside of the luminaire with the door 18 in an open position to identify the longitudinal position of the lamp with respect to the optical cavity. As illustrated in FIG. 3, the indicia are shown as letters of the alphabet.

To modify or select the focal axis tilt of the lamp within the optical cavity, a pair of threaded bolts 88 extend through the elongated slots 62 in the bottom flanges 60 of the socket mounting bracket and are threaded into the threaded apertures 72 in the foot portions 70 of the L-shaped leg portions of the socket mounting plate. The underside of each of the bottom flanges 60 are provided with indicia 90 which indicate the focal axis tilt of the lamp 38 within the optical cavity with the end edge 92 of the foot portion 70 being indicative of that position. For example, in the FIG. 3 embodiment, the end edge 92 of the foot portion 70 is indicated to be at position 4 on the numerical scale illustrated at 90.

A conventional sealing ring 94 is employed between the rim of the reflector 24 and a complementary rim on the reflector 22 to prevent dust and other deleterious materials from entering the optical cavity and a second ring seal 96 is provided between the socket mounting bracket 42 and the rear end of the reflector 24.

As will be apparent from the foregoing, the lamp socket mounting and adjusting assembly of this invention provides for locating the lamp 38 within the optical cavity at a plurality of different focal points by means of adjusting the notched arm portions 66 of the socket mounting plate into any one of the five different depressions between the teeth 56 of the socket mounting bracket. The angle or the focal axis tilt can also be adjusted when the lamp is positioned at any one of its plurality of different focal points by sliding the foot member 70 to any one of a number of positions with respect to the indicia 90 on the underside of the bottom flanges 60 and tightening the threaded bolts 88 to hold the lamp socket at the preferred, preselected tilt.

We claim:

1. In an outdoor lighting luminaire including an inverted open bottomed dish-shaped housing having a slip fitter mounting bracket on one end thereof and an optical cavity defined by a reflector secured to said housing and a refractor carrying door closing off the open bottom of said housing at the other end thereof, the improved lamp socket mounting and adjusting assembly secured to the interior of said housing comprising:

a bracket having a main body portion, a top flange extending normal to said main body portion, a pair of side flanges extending normal to said main body portion and a pair of bottom flanges extending at an obtuse angle from said main body portion, said main body portion having a socket receiving aperture therethrough, each of said side flanges having an elongated open-ended cut-out portion therein and a plurality of teeth in each of said cut-out portions, each of said bottom flanges having an elongated slot therein;

a socket mounting plate and a lamp socket, said socket mounting plate having a pair of notched arm portions extending laterally therefrom and a pair of L-shaped leg portions extending downwardly therefrom, said socket being mounted to one side of said socket mounting plate and said L-shaped leg portions including a threaded aperture therethrough; and securing means extending through said elongated slots in said bottom flanges and threadably received in said threaded apertures in said L-shaped leg portions while said notched arm portions of said socket mounting plate are engaged with predetermined ones of said plurality of teeth in said cut-out portions of said side flanges, whereby said lamp socket may be predeterminably positioned with respect to said optical cavity.

2. The improved lamp socket mounting and adjusting assembly according to claim 1 wherein said bracket is secured to the interior of said housing through said top flange.

3. The improved lamp socket mounting and adjusting assembly according to claim 1 wherein indicia of focal axis tilt are provided on said pair of bottom flanges and indicia of focal point location are provided on said pair of side flanges adjacent said cut-out portions.

4. The improved lamp socket mounting and adjusting assembly according to claim 3 wherein the end edge of said L-shaped leg portions are adjacent said elongated slots in said bottom flanges and combine with said indicia on said bottom flanges to indicate focal axis tilt.

5. The luminaire according to claim 1 wherein said bracket is secured to the interior of said housing through said top flange.

6. The luminaire according to claim 1 wherein indicia of focal axis tilt are provided on said pair of bottom flanges and indicia of focal point location are provided on said pair of side flanges adjacent said cut-out portions.

7. The luminaire according to claim 6 wherein the end edge of said L-shaped leg portions are adjacent said elongated slots in said bottom flanges and combine with said indicia on said bottom flanges to indicate focal axis tilt.

8. An outdoor lighting luminaire comprising:

an open bottomed inverted dish-shaped housing including slip-fitter means at one end thereof for mounting said luminaire to a luminaire support pipe;

a reflector having a lamp socket receiving opening in one end thereof secure to the inside of said housing in the end thereof remote from said slip-fitter means;

a refractor carrying door member pivotally secured to said housing and constructed and arranged close off the opened bottom of said housing, said refractor and said reflector combining to form an optical cavity when said door member is in a closed position;

a lamp socket mounting and adjusting assembly secured to the inside of said housing adjacent the lamp socket receiving opening in said reflector, said lamp socket mounting and adjusting assembly including a bracket fixedly mounted to said housing and a socket mounting plate adjustably mounted to said bracket, said bracket including a main body portion having a socket receiving aperture therethrough, a top flange extending normal to said main body portion, a pair of side flanges extending normal to said main body portion with each of said side flanges having an elongated open ended cut out portion therein and a plurality of teeth in each of said cut out portions, said bracket further including a pair of bottom flanges extending at an obtuse angle therefrom and each including therein an elongated slot;

said socket mounting plate having a pair of notched arm portions extending laterally therefrom and a pair of L-shaped leg portions extending downwardly therefrom said L-shaped leg portions including a threaded aperture therethrough;

a lamp socket secured to said socket mounting plate and projecting through said socket receiving opening in said reflector into said optical cavity; and securing means extending through said elongated slots in said bottom flanges and threadably received in said threaded apertures and said L-shaped leg portions while said notched arm portions of said socket mounting plate are engaged with predetermined ones of said plurality of teeth in said cut out portions of said side flanges whereby said lamp socket mounting plate is variably positionable on said bracket to vary both the focal point and the focal axis tilt of said socket with respect to said reflector.

* * * * *